(12) United States Patent
Hsieh

(10) Patent No.: US 9,972,447 B2
(45) Date of Patent: May 15, 2018

(54) PRINTED SUPERCAPACITORS BASED ON GRAPHENE

(71) Applicant: Bing R. Hsieh, Pleasanton, CA (US)

(72) Inventor: Bing R. Hsieh, Pleasanton, CA (US)

( * ) Notice: Subject to any disclaimer, the term of this patent is extended or adjusted under 35 U.S.C. 154(b) by 153 days.

(21) Appl. No.: 14/886,033

(22) Filed: Oct. 17, 2015

(65) Prior Publication Data

US 2016/0133396 A1 May 12, 2016

Related U.S. Application Data

(60) Provisional application No. 62/077,067, filed on Nov. 7, 2014, provisional application No. 62/119,775, filed on Feb. 23, 2015.

(51) Int. Cl.
| | |
|---|---|
| *H01G 11/38* | (2013.01) |
| *H01G 11/70* | (2013.01) |
| *H01G 11/10* | (2013.01) |
| *H01G 11/28* | (2013.01) |
| *H01G 11/86* | (2013.01) |
| *H01G 11/72* | (2013.01) |
| *H01G 11/84* | (2013.01) |

(52) U.S. Cl.
CPC ............ *H01G 11/38* (2013.01); *H01G 11/10* (2013.01); *H01G 11/28* (2013.01); *H01G 11/70* (2013.01); *H01G 11/72* (2013.01); *H01G 11/84* (2013.01); *H01G 11/86* (2013.01); *Y02E 60/13* (2013.01)

(58) Field of Classification Search
None
See application file for complete search history.

(56) References Cited

U.S. PATENT DOCUMENTS

| | | | |
|---|---|---|---|
| 6,535,398 | B1 | 3/2003 | Moresco |
| 8,927,149 | B2 * | 1/2015 | Ohara .................... H01M 4/13 429/141 |
| 2008/0111444 | A1 * | 5/2008 | Mabuchi ............... H02N 1/006 310/309 |
| 2010/0175934 | A1 | 7/2010 | Lam et al. |
| 2010/0178543 | A1 | 7/2010 | Gruner et al. |
| 2011/0281162 | A1 | 11/2011 | Buiel et al. |
| 2012/0077095 | A1 | 3/2012 | Roumi et al. |
| 2013/0250479 | A1 | 9/2013 | Manohara et al. |

(Continued)

FOREIGN PATENT DOCUMENTS

WO    2014097015 A1    6/2014

OTHER PUBLICATIONS

El-Kaby, "Scalable fabrication of high-power graphene micro-supercapacitors for flexible and on-chip energy storage", Nature Communications, 2013, 4, 1475.

(Continued)

*Primary Examiner* — Dion R Ferguson
(74) *Attorney, Agent, or Firm* — R'Sue Popowich Caron

(57) ABSTRACT

Supercapacitors are important on-chip micro-power sources for microelectronics. In addition to their ultra-fast charge and discharge rate, excellent stability, long cycle life and very high power density, supercapacitors based on graphene have garnered substantial attention in recent years due to their significant improvement in energy density. Disclosed herein are designs for parallel arrays of carbon electrodes that have interdigitated current collectors. Low-cost, high throughput methods of manufacturing that use printing processes are also disclosed.

20 Claims, 11 Drawing Sheets

(56) References Cited

U.S. PATENT DOCUMENTS

| | | |
|---|---|---|
| 2014/0029161 A1 | 1/2014 | Beidaghi et al. |
| 2014/0255798 A1* | 9/2014 | Amine ................ H01M 12/08 |
| | | 429/405 |
| 2015/0098167 A1* | 4/2015 | El-Kady ............... H01G 11/26 |
| | | 361/502 |
| 2015/0235776 A1 | 8/2015 | Miller |
| 2016/0172123 A1* | 6/2016 | Yang .................... H01G 11/24 |
| | | 361/502 |

OTHER PUBLICATIONS

El-Kady, "Engineering three-dimentional hybrid supercapacitors and microsupercapacitors for high-performance integrated energy storage", PNAS 2015 112 (14) 4233-4238).

Wu, "Graphene-based in-plane micro-supercapacitors with high power and energy densities", Nature Communications, 2013, 4, 2487.

Zhiwei Peng et al. "Flexible and Stackable Laser Induced Graphene Supercapacitors" ACS Appl. Mater. Interfaces, 2015, 7 (5), pp. 3414-3419.

ISR for PCT/US2015/056116.

International Preliminary Report on Patentability for PCTUS2015056116.

International Search Report for PCTUS2015056116.

* cited by examiner

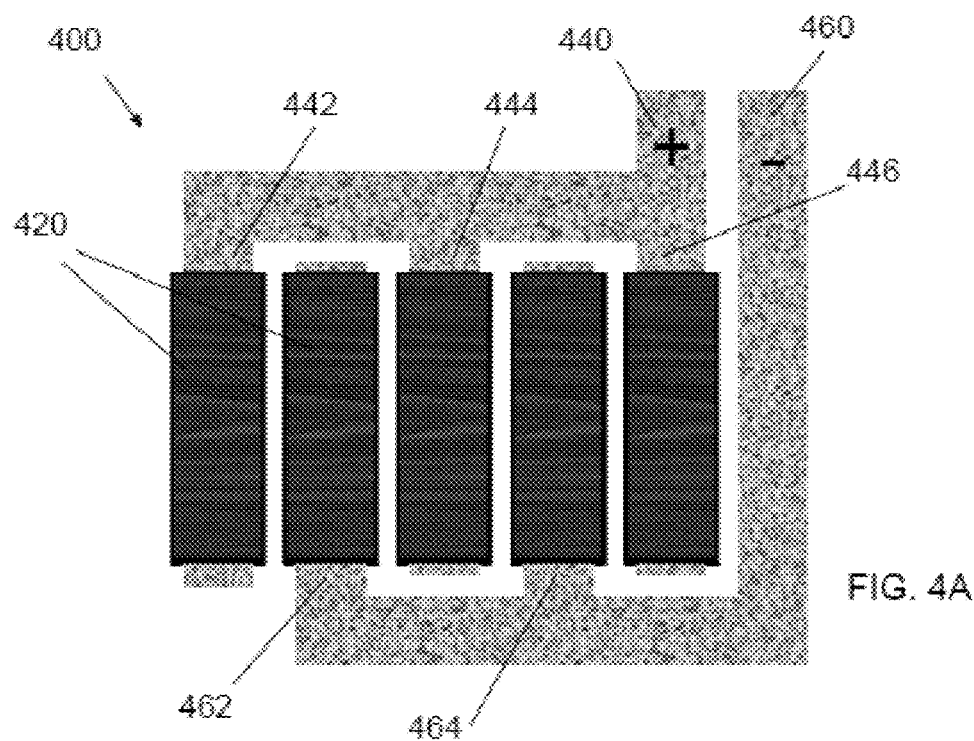
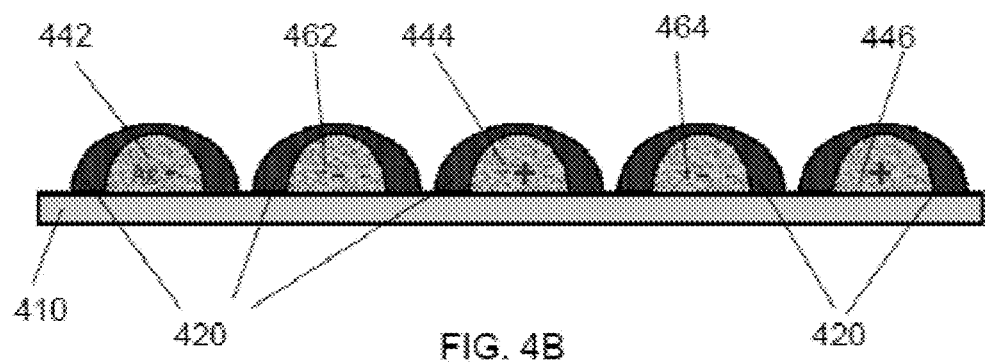

US 9,972,447 B2

PRINTED SUPERCAPACITORS BASED ON GRAPHENE

BACKGROUND OF THE INVENTION

Field of the Invention

This invention relates generally to supercapacitors, and, more specifically, to graphene-based microsupercapacitors, and low-cost, high throughput methods of making same.

Capacitors are storage devices that store electrical energy on an electrode surface. Unlike traditional capacitors consisting of plates separated by dielectric material, supercapacitors, sometimes referred to as ultracapacitors, electrochemical capacitors or double layer capacitors, are electrochemical cells that create and store energy by microscopic charge separation at an electrical chemical interface between electrode and electrolyte. Supercapacitors store more energy than traditional capacitors and discharge this energy at higher rates than rechargeable batteries. In addition, the cycle life of electrochemical capacitors is on the order of $10^5$ to $10^6$ cycles, far exceeding that of battery systems (~800-1000 cycles). These advantages are achievable because no rate-determining or life-limiting phase transformations take place at the electrode/electrolyte interface.

Ultracapacitors are attractive for potential applications in emerging technology areas that require electric power in the form of short bursts. Examples of such applications include digital communication devices that require power pulses in the millisecond range and traction power systems in electric vehicles where high power demand can last for seconds up to minutes.

Supercapacitors have two electrodes that are isolated from electrical contact with each other by an electronically insulating electrolyte. The electrolyte may be a solid or gel polymer electrolyte. Each electrode is in intimate contact with a current collector.

When an electric potential is applied to a supercapacitor cell, anions flow to the positive electrode and cations flow to the negative electrode under the influence of the electric field generated between the electrodes. In the absence of any electrochemical reaction, this leads to the creation of diffused, electrically charged layers, also known as electrical double layers, very close to the electrodes. Electroneutrality is not obeyed in this layer. The depth of the electrical double layer depends on the applied potential.

During discharge, the electrode potential or voltage across the supercapacitor electrodes causes ionic current to flow as the charges in the electrical double layer move spontaneously to achieve electroneutrality, while an electronic current flows through an external circuit between electrode current collectors. The external circuit can include a load, and the electronic circuit can supply power to the load. The load can be, for example, a portable radio, an electric motor, a light emitting diode or another electrical device.

The supercapacitor is not a primary cell, but it can be recharged. The process of charging and discharging can be repeated over and over. For example, after discharging a supercapacitor by powering an electrical device, the supercapacitor can be recharged by supplying potential to the connectors. When a capacitor is combined with a battery, the capacitor can handle peak power, and the battery can provide power for a sustained load between peaks. Such a hybrid power system can improve overall power performance and extend battery cycle life.

A major advantage of a supercapacitor is that it can deliver electrical energy at high power. A high power operation is predicated upon a low internal resistance. Hence, it is useful for supercapacitor electrolytes to have minimal resistance to ion movement and to provide an electronic conduction barrier between the two electrodes.

Micro-supercapacitors (MSCs) are important on-chip micro-power sources for microelectronics. In addition to their ultra-fast charge and discharge rate, excellent stability, long cycle life and very high power density, MSCs based on graphene have garnered substantial attention in recent years due to their significant improvement in energy density. This advancement was made possible by the use of graphene oxide (GO) aqueous dispersion in conjunction with in-plane interdigitated electrode designs. The so-called LightScribe graphene (LSG) MSCs are fabricated by direct laser writing on a 3.0 µm GO thin film which expands to 7.6 µm after laser exposure (780 nm at 47 mW), without using a current collector (see El-Kaby, "Scalable fabrication of high-power graphene micro-supercapacitors for flexible and on-chip energy storage", Nature Communications, 2013, 4, 1475, doi:10.1038/ncomms2446 and El-Kady, "Engineering three-dimentional hybrid supercapacitors and microsupercapacitors for high-performance integrated energy storage", PNAS 2015 112 (14) 4233-4238). The so-called methane plasma reduced graphene (MPG) MSCs consist of very thin layers of graphene (15 nm) and a gold current collector, both of which are deposited using conventional semiconductor lithographic processes (See Wu, "Graphene-based in-plane micro-supercapacitors with high power and energy densities", Nature Communications, 2013, 4, 2487; Schwab, "Graphene-based in-plane supercapacitors, WO2014097015 A1). Both MSCs show high energy densities similar to a commercial thin film lithium ion batteries (0.3-1 mWh/cm$^3$) while maintaining four orders of magnitude higher power density (200 W/cm$^3$). But such fabrication processes are difficult to scale up for large-volume manufacturing, and are therefore quite expensive.

It would be very useful to realize the potential of graphene-based MSCs at low cost for large scale manufacturing of large format supercapacitors.

BRIEF DESCRIPTION OF THE DRAWINGS

The foregoing aspects and others will be readily appreciated by the skilled artisan from the following description of illustrative embodiments when read in conjunction with the accompanying drawings.

FIG. 4A is a plan view and FIG. 4B is a cross-section schematic illustration of an array of supercapacitors, according to another embodiment of the invention.

SUMMARY

Figure 1A:
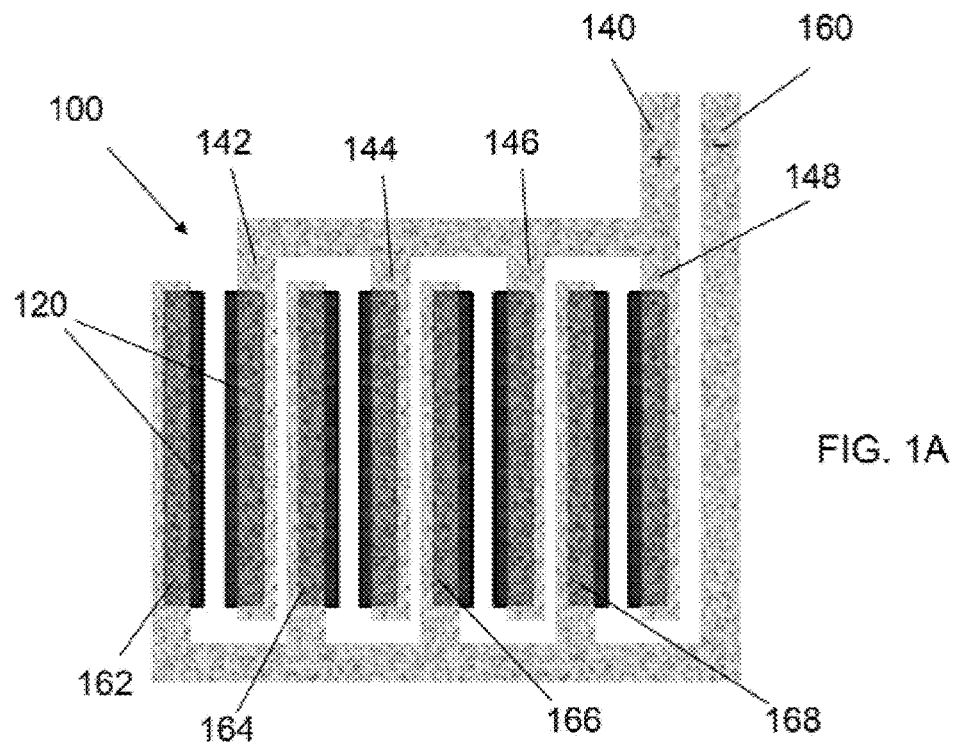
FIG. 1A is a plan view and FIG. 1B is a cross-section schematic illustration of an array of supercapacitors, according to an embodiment of the invention.

In one embodiment of the invention, a supercapacitor device array is disclosed. The device contains a plurality of devices arranged parallel to one another on a substrate. Each device has a first carbon electrode that has a first metal current collector layer in contact with at least a portion of one sidewall of the first electrode and optionally some or all of the top surface of the first carbon electrode. Each device also has a second carbon electrode that has a second metal current collector layer in contact with at least a portion of the sidewall of the second electrode that faces away from the first carbon electrode. Optionally the second metal current collector can cover some or all of the top surface of the second carbon electrode. The first and second carbon electrodes are parallel. The first and second metal current collectors have opposite polarity. Throughout the array, the first metal current collector layer and the second metal current collector layer each has a separate comb structure and together form an interdigitated structure. There is also an electrolyte in contact with the carbon electrodes. Each current collector comb structure has fingers.

In another embodiment of the invention, each device of the supercapacitor device array also has a third carbon electrode that is parallel to the first carbon electrode and a fourth carbon electrode that is parallel to the second carbon electrode. The first metal current collector layer is also in contact with at least a portion of one sidewall and optionally some or all of the top surface of the third carbon electrode. The second metal current collector layer is also in contact with at least a portion of one sidewall and optionally some or all of the top surface of the fourth carbon electrode.

In another embodiment of the invention, each device of the supercapacitor device array also has a fifth carbon electrode that is in continuous contact with both the first carbon electrode and the third carbon electrode, extending from the first carbon electrode to the third carbon electrode and encapsulating the first metal current collector. Each device of the supercapacitor device array also has a sixth carbon electrode that is in continuous contact with both the second carbon electrode and the fourth carbon electrode, extending from the second carbon electrode to the fourth carbon electrode and encapsulating the second metal current collector.

The first carbon electrode, the second carbon electrode, the third carbon electrode and the fourth carbon electrode may all comprise the a first carbon material, and the fifth carbon electrode and the sixth carbon electrode may comprise a second carbon material. In one arrangement, some or all of the carbon electrodes may contain carbon materials that are different from the others. Any of the carbon electrodes that make contact with the substrate may alternatively extend into the substrate.

In another embodiment of the invention, a supercapacitor device array has a first current collector on a substrate. The first current collector has a comb structure with parallel first current collector fingers. The array also has a second current collector on the substrate. The second current collector has a comb structure with parallel second current collector fingers. The first current collector and the second current collector are arranged in an interdigitated configuration and have opposite polarity.

The supercapacitor device array also includes an array of parallel carbon lines with first carbon lines and second carbon lines. The first carbon lines and the second carbon lines occupy alternating positions in the array of parallel carbon lines. The first carbon lines overlie the first current collector fingers and make continuous contact with the substrate on both sides of the first current collector fingers, thereby encapsulating the first current collector fingers. The second carbon lines overlie the second current collector fingers and make continuous contact with the substrate on both sides of the second current collector fingers, thereby encapsulating the second current collector fingers. There is also an electrolyte in contact with the array of parallel carbon lines. The first carbon lines and the second carbon lines may or may not be made of the same carbon material.

In another embodiment of the invention, a supercapacitor device array has a first current collector on a substrate. The first current collector has a comb structure with parallel first current collector fingers, wherein each first current collector finger has an upper surface, a lower surface in contact with the substrate, a first sidewall, and a second sidewall opposite to the first sidewall. The array also has a second current collector on the substrate. The second current collector has a comb structure with parallel second current collector fingers, wherein each second current collector finger has an upper surface, a lower surface in contact with the substrate, a first sidewall, and a second sidewall opposite to the first sidewall. The first current collector and the second current collector are arranged in an interdigitated configuration.

The supercapacitor device array also includes an array of parallel first carbon electrode lines that are parallel to the first current collector fingers. Each first carbon electrode line is in contact with the first sidewall of a first current collector finger. The supercapacitor device array also includes an array of parallel second carbon electrode lines that are parallel to the first current collector fingers. Each second carbon electrode line is in contact with the second sidewall of a first current collector finger. The supercapacitor device array also includes an array of parallel third carbon electrode lines that are parallel to the second current collector fingers. Each third carbon electrode line is in contact with the first sidewall of a second current collector finger. The supercapacitor device array also includes an array of parallel fourth carbon electrode lines that are parallel to the second current collector fingers. Each fourth carbon electrode line is in contact with the second sidewall of a second current collector finger. Some or all of the carbon lines may be in contact with the substrate. At least one of the first and second current collectors is in contact with the substrate. There is also an electrolyte in contact with the first, second, third, and fourth carbon electrode lines.

In another embodiment of the invention, a supercapacitor device array has a first array of parallel carbon lines with first carbon lines and second carbon lines. The first carbon lines and the second carbon lines occupy alternating positions on a substrate in the first array of parallel carbon lines. In one arrangement, the first array of parallel carbon lines extend into the substrate rather than resting on the surface of the substrate. The supercapacitor device array also includes a first current that has a comb structure with parallel first current collector fingers. The first current collector fingers overlie the first carbon lines and make no contact with the substrate. There is also a second current collector that has a comb structure with parallel second current collector fingers. The second current collector fingers overlie the second carbon lines and make no contact with the substrate. The first current collector and the second current collector have opposite polarity.

The supercapacitor device array also includes a second array of parallel carbon lines with third carbon lines and fourth carbon lines. The second array of parallel carbon lines is parallel to the first array of parallel carbon lines. The third carbon lines and the fourth carbon lines occupy alternating positions in the second array of parallel carbon lines. The third carbon lines overlie the first current collector fingers and make continuous contact with the first carbon lines on both sides of the first current collector fingers and optionally with the substrate, thereby encapsulating the first current collector fingers. The fourth carbon lines overlie the second current collector fingers on both sides of the second current collector fingers and make continuous contact with the second carbon lines and optionally with the substrate, thereby encapsulating the second current collector fingers. There is also an electrolyte in contact with at least the second array of parallel carbon lines.

In another embodiment of the invention. A supercapacitor device array has a first array of parallel carbon lines with first carbon lines and second carbon lines. The first carbon lines and the second carbon lines occupy alternating positions in the first array of parallel carbon lines. There is a first current collector that has a comb structure with parallel first current collector fingers. The first current collector fingers make no contact with the substrate and overlie the first carbon lines. There is also a second current collector that has a comb structure with parallel second current collector fingers. The second current collector fingers make no contact with the substrate and overlie the second carbon lines.

The supercapacitor device array also includes a second array of parallel carbon lines with the third carbon lines and the fourth carbon lines. The second array of parallel carbon lines is parallel to the first array of parallel carbon lines. The third carbon lines and the fourth carbon lines occupy alternating positions in the second array of parallel carbon lines. The third carbon lines overlie the first current collector fingers without making contact with the first carbon lines. The fourth carbon lines overlie the second current collector fingers without making contact with the second carbon lines. There is also an electrolyte in contact with the first array of parallel carbon lines and the second array of parallel carbon lines.

For any of the supercapacitor device arrays described herein, the first current collector and the second current collector have opposite polarities. The first and second current collectors may or may not be in contact with the substrate. Any of the carbon electrodes that make contact with the substrate may alternatively extend into the substrate. The supercapacitor device array may be a microsupercapacitor device array. For any of the supercapacitor device arrays described herein, the carbon lines may all contain the same carbon material, or some or all of the carbon lines may contain different carbon materials.

In one arrangement, the carbon electrodes have a thickness between about 0.01 µm and 1000 µm or between about 0.1 µm and 100 µm. The substrate material may be any of paper, plastic, glass, ceramic, or silicon. The plastic may be any of poly(methyl methacrylate), polycarbonate, polystyrene, polyether ether ketone, polyaryl sulphone, polypheneylene sulfide, polyethylene terephthalate, polyethylene naphthalate, and polyimide. The carbon electrode material(s) may be porous and may be any of activated carbon, carbon aerogels, carbon onions, carbide derived carbon, carbon nanotubes, fullerenes, graphite, graphene, and mixtures thereof. The carbon electrode materials may have any of a wide range of hierarchical structures and pore sizes, including macroporous (pore diameters greater than 50 nm), mesoporous (pore diameters between 2 and 50 nm), and/or microporous (pore diameters less than 2 nm). The carbon electrode materials may also doped with oxygen, nitrogen, and/or boron.

The carbon may further include one or more of a binder, a conducting additive, a metal oxide, and a metal sulfide. The binder include polyvinylidene fluoride and its copolymers. The conducting additive may be any of metal powders, metal nanowires, and conducting polymers. The conducting polymer may be any of acetylene black, polyaniline, polypyrrole, and polythiophene. The inclusion of polyaniline, polypyrrole or polythiophene can be achieved by a conventional dispersion process involving mechanical mixing or by in situ electropolymerication of the corresponding aniline, pyrrole or thiophene monomer onto a preformed carbon electrode. The metal oxide may be any of ruthenium ($RuO_2$), iridium ($IrO_2$), iron ($Fe_3O_4$), cobalt ($Co_3O_4$), nickel (NiO and $Ni(OH)_2$), vanadium ($V_2O_5$), and manganese ($MnO_2$). The metal sulfide may be titanium sulfide ($TiS_2$).

The current collector layers may be made of silver, gold, aluminum, copper, or nickel. The current collector layers may be made of metal nanowires, metal nanoparticles, or combinations thereof. The current collector layers may be a mixture of silver nanowires, graphene and binder. The electrolyte may be any of aqueous liquid electrolytes, organic liquid electrolytes, ionic liquids and solids, polymer gel electrolytes, solid polymer electrolytes, and combinations thereof.

In another embodiment of the invention, a method of making a supercapacitor device array is provided. The method involves printing carbon ink onto a working surface of a substrate to form a parallel array of carbon electrodes and then drying the carbon ink. Then metal ink is printed to form current collectors in contact with the array of carbon electrodes thus forming two interdigitated current collector structures as in any of the embodiments described above. The substrate is heat treated. The heat treatment may involve heating to a temperature between 150 and 300° C. for between 1 and 120 minutes. Finally an electrolyte is applied make contact with the carbon electrodes. The electrolyte may be any of liquid electrolytes, ionic liquids and solids, polymer gel electrolytes, and solid polymer electrolytes. In one arrangement, after the metal ink is printed, there is an additional step of printing the carbon ink over the current collectors and the carbon electrodes to encapsulate the interdigitated current collector structures, as described in some embodiments above.

Another method of making a supercapacitor device array involves a different ordering of the steps described above. First a metal ink is printed onto a working surface of a substrate to form two, non-connecting, interdigitated current collector comb structures as described above. Then the substrate is heat treated. The heat treatment may involve heating to a temperature between 150 and 300° C. for between 1 and 120 minutes. Next carbon ink is printed onto the interdigitated current collector structures to form an array of parallel carbon strips such that there is at least one carbon strip on each finger of the comb structures. The carbon ink is dried. Finally an electrolyte is applied make contact with the carbon electrodes. The electrolyte may be any of liquid electrolytes, ionic liquids and solids, polymer gel electrolytes, and solid polymer electrolytes.

In one arrangement, a method of making a supercapacitor device array involves using a laser to carbonize a parallel array of carbon electrodes into a working surface of a substrate. Then metal ink is printed to form current collectors in contact with the array of carbon electrodes thus forming two interdigitated current collector structures as in any of the embodiments described above. The substrate is heat treated. The heat treatment may involve heating to a temperature between 150 and 300° C. for between 1 and 120 minutes. Finally an electrolyte is applied make contact with the carbon electrodes. The electrolyte may be any of liquid electrolytes, ionic liquids and solids, polymer gel electrolytes, and solid polymer electrolytes. In one arrangement, after the metal ink is printed, there is an additional step of printing carbon ink over the current collectors and the carbon electrodes to form additional carbon electrode material, as described in some embodiments above.

The working surface of the substrate may be prepared with a polymer buffer layer, an oxygen plasma treatment, an ultraviolet ozone treatment, or any combination thereof. The carbon ink contains at least one carbon material, an optional binder, an optional conducting additive, an optional metal oxide, and an optional metal sulfide. The carbon material may be any of activated carbon, carbon aerogels, carbon onions, carbide derived carbon, carbon nanotubes, graphite, graphene, and mixtures thereof. If the carbon ink contains graphene oxide an additional reducing reaction step is used to convert the graphene oxidize to graphene. The metal oxide may be any of ruthenium ($RuO_2$), iridium ($IrO_2$), iron ($Fe_3O_4$), cobalt ($Co_3O_4$), nickel (NiO and $Ni(OH)_2$), vanadium ($V_2O_5$), and manganese ($MnO_2$). The sulfide may be titanium sulfide ($TiS_2$). The metal ink may contain metal nanoparticles or metal complex precursors containing any of silver, gold, aluminum, copper and nickel. Printing methods that can be used in the embodiments of the invention include inkjet, Gravure, flexo, offset, microcontact, screen, and co-extrusion printing.

DETAILED DESCRIPTION

The preferred embodiments are illustrated in the context of supercapacitors and using a printing process to manufacture same. The skilled artisan will readily appreciate, however, that the materials and methods disclosed herein will have application in a number of other contexts where high-throughput manufacturing is desirable, particularly where low cost is important.

These and other objects and advantages of the present invention will become more fully apparent from the following description taken in conjunction with the accompanying drawings.

All publications referred to herein are incorporated by reference in their entirety for all purposes as if fully set forth herein.

A high throughput printing approach to manufacture large format supercapacitors (SCs) and microsupercapacitors (MSCs) is disclosed. In some embodiments of the invention, direct printing of aqueous graphene oxide (GO) inks onto a substrate is followed by radiation reduction of the printed GO patterns to graphene electrodes. Such methods yield SCs and MSCs with superior performance characteristics as compared with direct laser scribing processes in terms of enhanced stability, reduced leakage current, and improved ion transport. This may be due to the avoidance of unstable GO interspatial layers associated with laser scribing.

All publications referred to herein are incorporated by reference in their entirety for all purposes as if fully set forth herein. All ranges of values disclosed herein also contain any range subsumed therein.

FIG. 1A is a plan view illustration of a portion of a SC array 100, according to an embodiment of the invention. The array 100 is on a substrate that is not shown. There are several carbon electrodes 120 arranged parallel to one another. Examples of useful carbon electrode 120 materials include activated carbon, carbon aerogels, carbon onions, carbide derived carbon, carbon nanotubes, graphite, graphene, and mixtures thereof. There is a positive current collector 140 that has a comb structure with four fingers or lines 142, 144, 146, 148, in the comb. There is a negative current collector 160 that also has a comb structure with four fingers or lines 162, 164, 166, 168 in the comb. The positive current collector 140 and the negative current collector 160 are interdigitated, that is they are interlocked, as the fingers of two clasped hands. Examples of useful materials for the current collectors 140, 160 include metals such as gold, silver, aluminum, copper and nickel. In one arrangement, the carbon electrodes 120 have been printed with a carbon ink onto the substrate (not shown). In another arrangement, the substrate (not shown) was first coated with a carbon film and then the carbon film was etched or laser ablated to leave only the carbon electrodes 120. In both arrangements, the current collectors 140, 160 have been printed onto the carbon electrodes 120. There can be any number of fingers in the current collectors 140, 160.

Figure 1B:
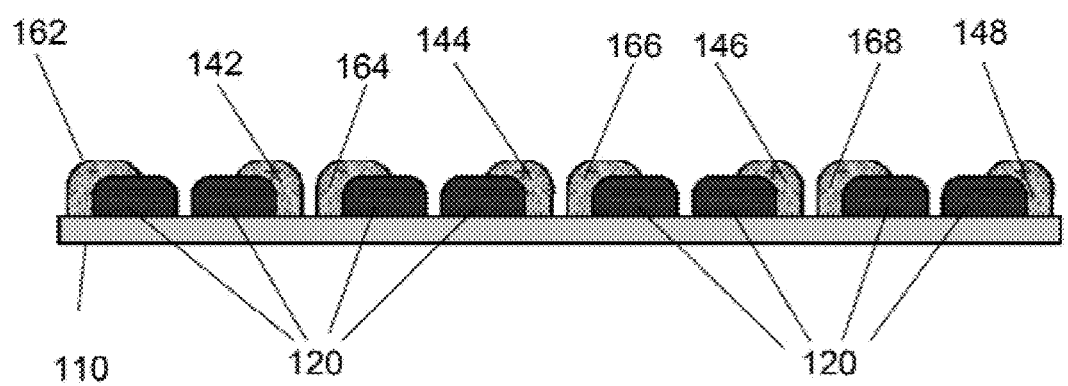

FIG. 1B is a cross-section schematic illustration of the array 100 of FIG. 1A. The carbon lines 120 are seen on the substrate 110. Examples of useful substrate 110 materials include paper, plastic, glass, ceramic, and silicon. Examples of useful plastics include but are not limited to poly(methyl methacrylate), polycarbonate, polystyrene, polyether ether ketone, polyaryl sulphone, polypheneylene sulfide, polyethylene terephthalate polyethylene naphthalate, and polyimide. In some arrangements, the working surface of the substrate 110 is treated with a polymer buffer layer coating, an oxygen plasma treatment or to an ultraviolet ozone treatment or some combination of these before any lines are printed, in order to ensure good adhesion and enhanced printability. The working surface of the substrate 110 is the surface of the substrate 110 onto which SC lines are printed.

In some arrangements, both sides of the substrate 110 can be working surfaces with SC lines printed on both sides.

The four fingers or lines 142, 144, 146, 148 of the positive current collector and the four fingers or lines 162, 164, 166, 168 of the negative current collector are labeled in FIG. 1B. It can be seen that the positive current collector 140 is in contact with alternate (i.e., every second one in the array) carbon electrodes 120 and that the negative current collector 160 is in contact with the carbon electrodes that are not contacted by the positive current collector 140. The current collectors are in contact with one sidewall of each carbon electrode line 120. In FIG. 1B, the current collectors cover entirely one sidewall of each electrode line 120. In other arrangements, the current collectors cover only a portion of one sidewall of each electrode line. FIG. 1B shows that the current collectors 140, 160 also cover a portion of the top surface of each carbon electrode line 120. In other arrangements, the current collectors 140, 160 are not on the top surface of each carbon electrode line 120 at all. In yet other arrangements, the current collectors 140, 160 completely cover the top surface of each carbon electrode line 120.

Both FIGS. 1A and 1B show that for any pair of adjacent carbon electrodes 120, the sidewalls that face one another are either both have no current collector layer or one is covered with the positive current collector layer 140 and the other is covered with the negative current collector layer 160. There is also an electrolyte layer (not shown) over the structures shown in FIGS. 1A and 1B.

Figure 2A:
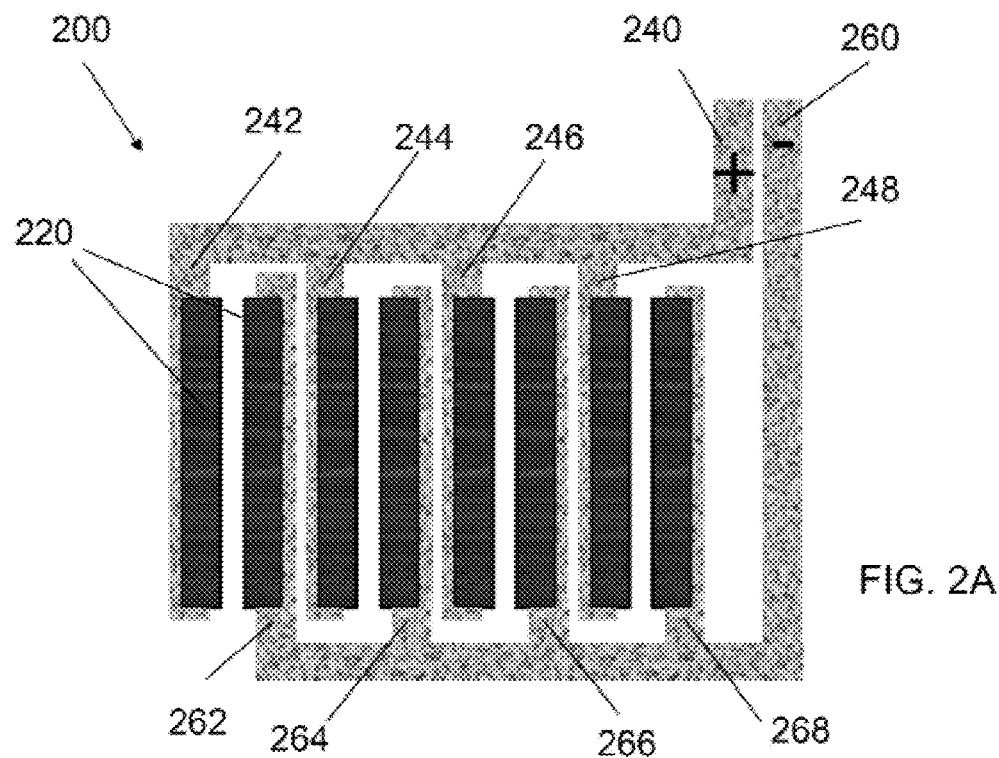
FIG. 2A is a plan view and FIG. 2B is a cross-section schematic illustration of an array of supercapacitors, according to another embodiment of the invention.

FIG. 2A is a plan view illustration of a portion of a SC array 200, according to an embodiment of the invention. The array 200 is on a substrate that is not shown. There is a positive current collector 240 that has a comb structure with four fingers or lines 242, 244, 246, 248, in the comb. There is a negative current collector 260 that also has a comb structure with four fingers or lines 262, 264, 266, 268 in the comb. The positive current collector 240 and the negative current collector 260 are interdigitated, that is they are interlocked, as the fingers of two clasped hands. Examples of useful materials for the current collectors 240, 260 include metals such as gold, silver, aluminum, copper and nickel. There are several carbon electrodes 220 arranged parallel to one another. Examples of useful carbon electrode 220 materials include activated carbon, carbon aerogels, carbon onions, carbide derived carbon, carbon nanotubes, graphite, graphene, and mixtures thereof. In one arrangement, the metal current collectors 240, 260 have been printed with a metal ink onto the substrate (not shown). In another arrangement, the substrate (not shown) was first coated with a metal film and then the metal film was etched or laser ablated to leave only the current collectors 240, 260. In both arrangements, the carbon electrodes 220 have been printed onto the current collectors 240, 260. There can be any number of fingers in the current collectors 240, 260.

Figure 2B:
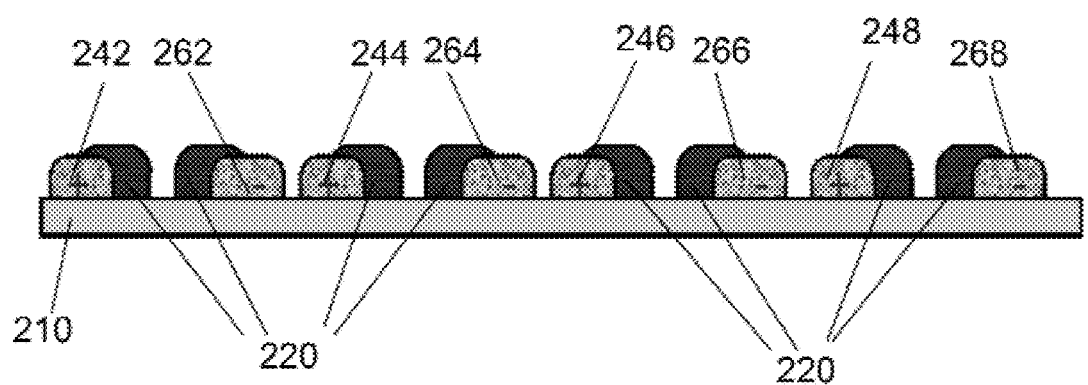

FIG. 2B is a cross-section schematic illustration of the array 200 of FIG. 2A. The four fingers or lines 242, 244, 246, 248 of the positive current collector and the four fingers or lines 262, 264, 266, 268 of the negative current collector are labeled in FIG. 2B. The carbon electrode lines 220 are along side of the current collector fingers 242, 244, 246, 248, 262, 264, 266, 268. FIG. 2B shows the carbon electrode lines 220 partially covering the tops of the current collector fingers 242, 244, 246, 248, 262, 264, 266, 268. In other arrangements, the carbon electrode lines 220 may fully cover the tops of the current collector fingers 242, 244, 246, 248, 262, 264, 266, 268 or may not extend onto the tops of the current collector fingers 242, 244, 246, 248, 262, 264, 266, 268 at all. Both FIGS. 2A and 2B show that for any pair of adjacent carbon electrodes 220, the sidewalls that face one another are either both have no current collector layer or one is in contact with the positive current collector layer 240 and the other is in contact with the negative current collector layer 260.

Examples of useful substrate 210 materials include paper, plastic, glass, ceramic, and silicon. Examples of useful plastics include but are not limited to poly(methyl methacrylate), polycarbonate, polystyrene, polyether ether ketone, polyaryl sulphone, polypheneylene sulfide, polyethylene terephthalate polyethylene naphthalate, and polyimide. In some arrangements, the working surface of the substrate 210 is treated with a polymer buffer layer coating, an oxygen plasma treatment, an ultraviolet ozone treatment, or some combination of these before the current collectors 240, 260 are printed in order to ensure good adhesion and enhanced printability. The working surface of the substrate 210 is the surface of the substrate 210 onto which SC lines are printed. In some arrangements, both sides of the substrate 210 can be working surfaces with SC lines printed on both sides. There is also an electrolyte layer (not shown) over the structures shown in FIGS. 2A and 2B.

Figure 3A:
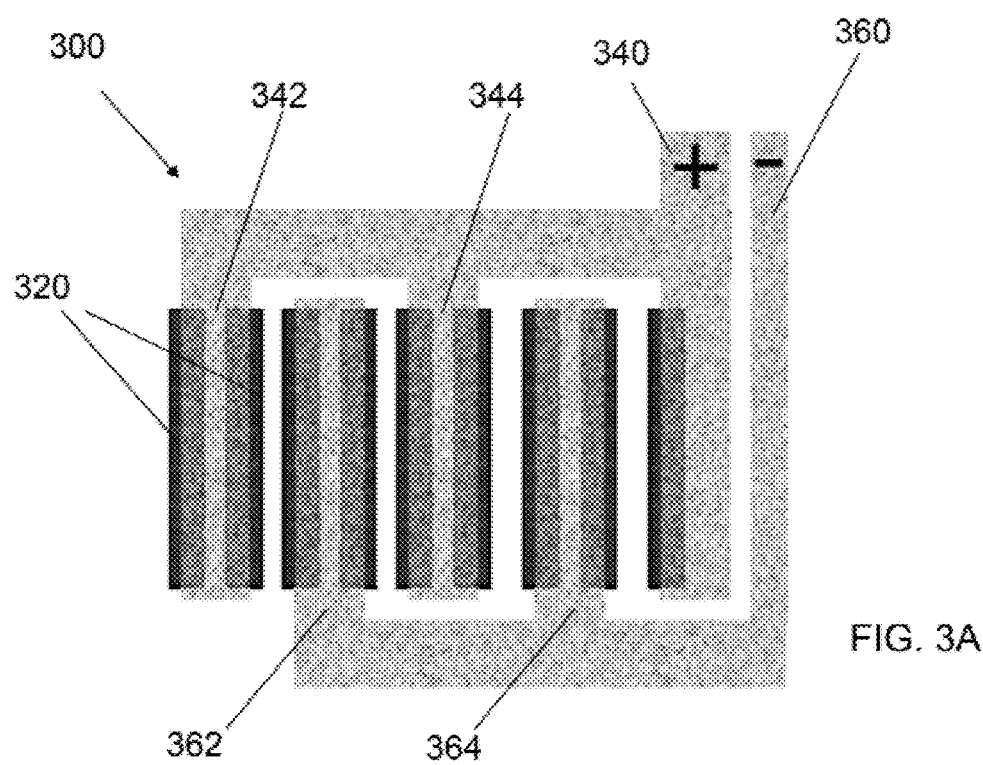
FIG. 3A is a plan view and FIG. 3B is a cross-section schematic illustration of an array of supercapacitors, according to another embodiment of the invention.

FIG. 3A is a plan view illustration of a portion of a SC array 300, according to another embodiment of the invention. The array 300 is on a substrate that is not shown. Again, there are several carbon electrodes 320 arranged parallel to one another. There is a positive current collector 340 that has a comb structure with two fingers or lines 342, 344 in the comb. There is a negative current collector 360 that also has a comb structure with two fingers or lines 362, 364 in the comb. The positive current collector 340 and the negative current collector 360 are interdigitated, that is they are interlocked, as the fingers of two clasped hands. In one arrangement, the carbon electrodes 320 have been printed with a carbon ink onto the substrate (not shown). In another arrangement, the substrate (not shown) was first coated with a carbon film and then the carbon film was etched or laser ablated to leave only the carbon electrodes 320. In both arrangements, the current collectors 340, 360 have been printed onto the carbon electrodes 320. There can be any number of fingers in the current collectors 340, 360.

Figure 3B:
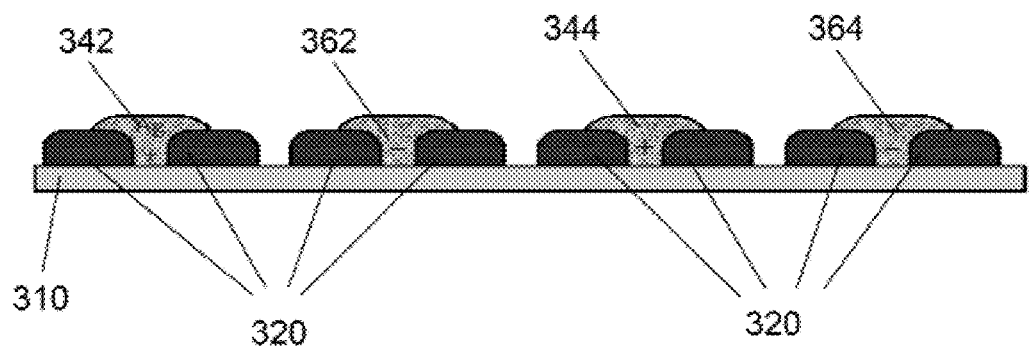

FIG. 3B is a cross-section schematic illustration of the array 300 of FIG. 3A. The carbon lines 320 are seen on the substrate 310. In some arrangements, the working surface of the substrate 310 is treated with a polymer buffer layer, an oxygen plasma treatment or to an ultraviolet ozone treatment or any combination of these before any lines are printed, in order to ensure good adhesion and enhanced printability. The working surface of the substrate 310 is the surface of the substrate 310 onto which SC lines are printed. In some arrangements, both sides of the substrate 310 can be working surfaces with SC lines printed on both sides. The two fingers or lines 342, 344 of the positive current collector and the two fingers or lines 362, 364 of the negative current collector are labeled in FIG. 3B. It can be seen that the positive current collector lines 342, 344 are in contact with alternate pairs of carbon electrodes 320 and that the negative current collector lines 362, 364 are in contact with pairs of carbon electrodes that are not contacted by the positive current collector 340. The current collectors 340, 360 are in contact with one sidewall of each carbon electrode line 320. In FIG. 3B, the current collectors cover entirely one sidewall of each electrode line 320. In other arrangements, the current collectors cover only a portion of one sidewall of each electrode line. FIG. 3B shows that the current collectors 340, 360 also cover a portion of the top surface of each carbon electrode line 320. In other arrangements, the current collectors 340, 360 are not on the top surface of each carbon electrode line 320 at all. In yet other arrangements, the current collectors 340, 360 completely cover the top surface of each carbon electrode line 320.

Both FIGS. 3A and 3B show that for any pair of adjacent carbon electrodes 320, the sidewalls that face one another are either both have no current collector layer or both are covered with the same current collector layer. Alternating pairs of adjacent carbon electrodes 320 have current collector layers of opposite sign. There is also an electrolyte layer (not shown) over the structures shown in FIGS. 3A and 3B.

Figure 3C:
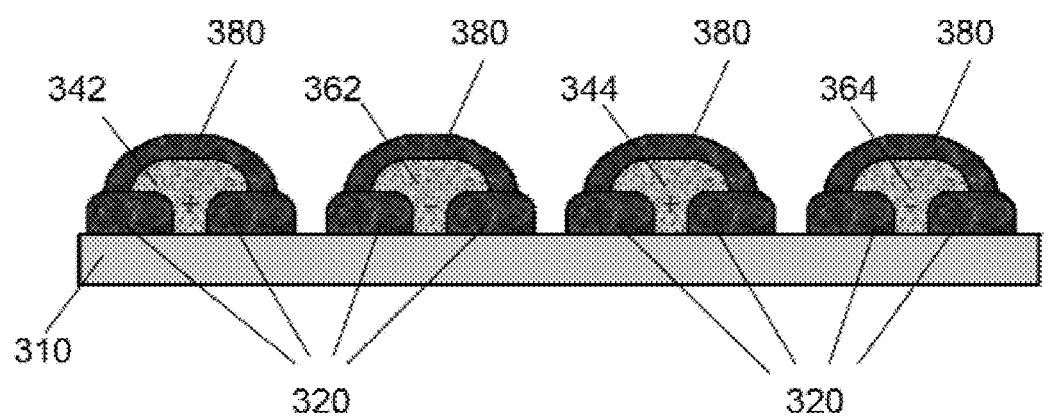
FIG. 3C is a cross-section schematic illustration of an array of supercapacitors in a variation of those shown in FIG. 3B, according to another embodiment of the invention

FIG. 3C is a cross-section schematic illustration of the array of supercapacitors shown in FIG. 3B with some added electrode material, according to another embodiment of the invention. There is an array of carbon electrode lines 380 that overlies the current collectors 342, 344, 362, 364 and the carbon electrode lines 320. The carbon electrode lines 380 make continuous contact with the carbon electrode lines 320, thereby encapsulating the current collectors 342, 344, 362, 364. There is also an electrolyte layer (not shown) over the structures shown in FIG. 3C.

FIG. 4A is a plan view illustration of a portion of a SC array 400, according to another embodiment of the invention. The array 400 is on a substrate that is not shown. There is a positive current collector 440 that has a comb structure with three fingers or lines 442, 444, 446 in the comb. There is a negative current collector 460 that has a comb structure with two fingers or lines 462, 464 in the comb. The positive current collector 440 and the negative current collector 460 are interdigitated, that is they are interlocked, as the fingers of two clasped hands. In one arrangement, the metal current collectors 440, 460 have been printed with a metal ink onto the substrate (not shown). In another arrangement, the substrate (not shown) was first coated with a metal film and then the metal film was etched or laser ablated to leave only the current collectors 440, 460. In both arrangements, the carbon electrodes 420 are arranged parallel to one another and have been printed onto the current collectors 440, 460. There can be any number of fingers in the current collectors 440, 460. There is a carbon electrode line 420 for each finger of the positive current collector 440 and for each finger of the negative current collector 460.

FIG. 4B is a cross-section schematic illustration of the array 400 of FIG. 4A. The three fingers or lines 442, 444, 446 of the positive current collector and the two fingers or lines 462, 464 of the negative current collector are labeled in FIG. 4B. The carbon electrode lines 420 cover the current collector fingers 442, 444, 446, 462, 464. There is also an electrolyte layer (not shown) over the structures shown in FIGS. 4A and 4B, which is the cross-section.

Figure 5A:
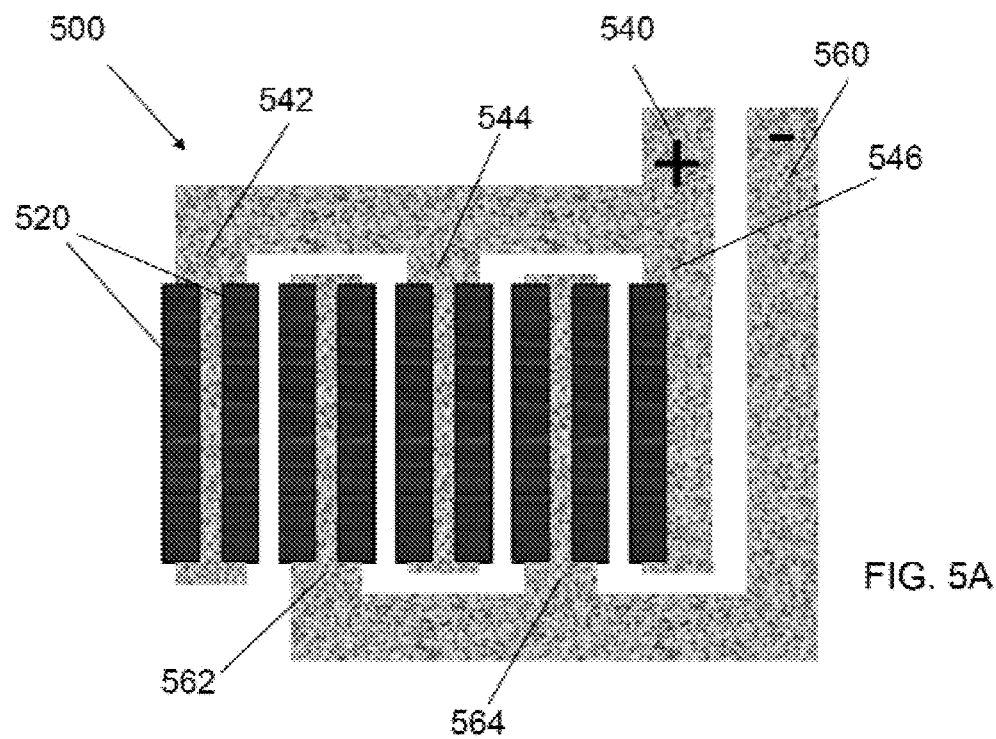
FIG. 5A is a plan view and FIG. 5B is a cross-section schematic illustration of an array of supercapacitors, according to another embodiment of the invention.

FIG. 5A is a plan view illustration of a portion of a SC array 500, according to another embodiment of the invention. The array 500 is on a substrate that is not shown. There is a positive current collector 540 that has a comb structure with three fingers or lines 542, 544, 546 in the comb. There is a negative current collector 560 that has a comb structure with two fingers or lines 562, 564 in the comb. The positive current collector 540 and the negative current collector 560 are interdigitated, that is they are interlocked, as the fingers of two clasped hands. In one arrangement, the metal current collectors 540, 560 have been printed with a metal ink onto the substrate (not shown). In another arrangement, the substrate (not shown) was first coated with a metal film and then the metal film was etched or laser ablated to leave only the current collectors 540, 560. In both arrangements, the carbon electrodes 520 are arranged parallel to one another and two carbon electrodes have been printed onto each of the current collectors 540, 560. There can be any number of fingers in the current collectors 540, 560. There are two carbon electrode lines 520 for each finger of the positive current collector 540 and for each finger of the negative current collector 560.

Figure 5B:
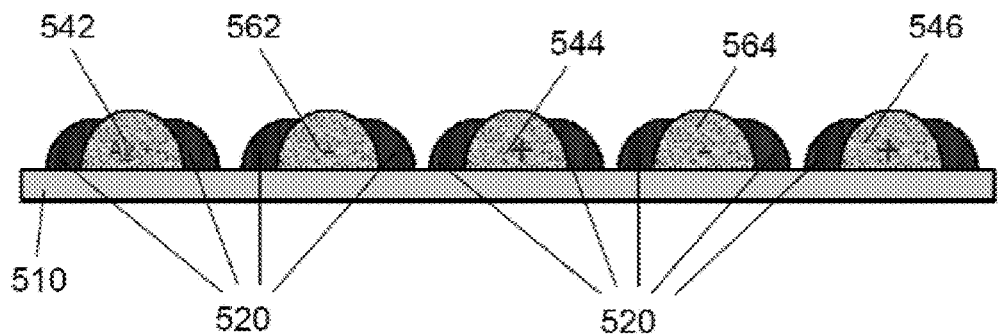

FIG. 5B is a cross-section schematic illustration of the array 500 of FIG. 5A. The three fingers or lines 542, 544, 546 of the positive current collector and the two fingers or lines 562, 564 of the negative current collector are labeled in FIG. 5B. It can be seen that the positive current collector lines 542, 544 are in contact with alternate pairs of carbon electrodes 520 and that the negative current collector lines 562, 564 are in contact with pairs of carbon electrodes that are not contacted by the positive current collector 540. The current collectors 540, 560 are in contact with one sidewall of each carbon electrode line 520. In FIG. 5B, the current collectors cover entirely one sidewall of each electrode line 520. In other arrangements, the current collectors cover only a portion of one sidewall of each electrode line. FIG. 5B shows that the current collectors 540, 560 do not extend onto the top surface of each carbon electrode line 520. In other arrangements, the current collectors 540, 560 are extend partially onto the top surface of each carbon electrode line 520. In yet other arrangements, the current collectors 540, 560 completely cover the top surface of each carbon electrode line 520. There is also an electrolyte layer (not shown) over the structures shown in FIGS. 5A and 5B.

Figure 6A:
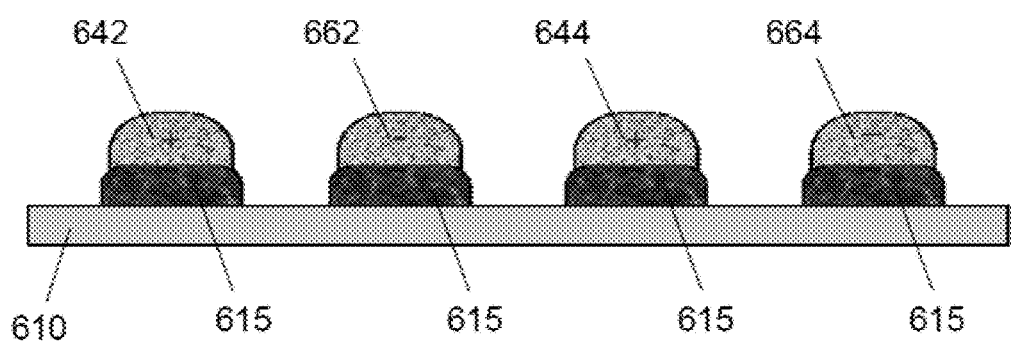
FIG. 6A is a cross-section schematic illustration of an array of supercapacitors that have a carbon layer between the substrate and the current collector, according to an embodiment of the invention.

FIG. 6A is a cross-section schematic illustration of an array of supercapacitors that have a carbon layer between the substrate and the current collector, according to an embodiment of the invention. There are carbon lines 615 printed onto the substrate 610. Two fingers or lines 642, 644 of the positive current collector and two fingers or lines 662, 664 of the negative current collector are also shown in FIG. 6A.

Figure 6B:
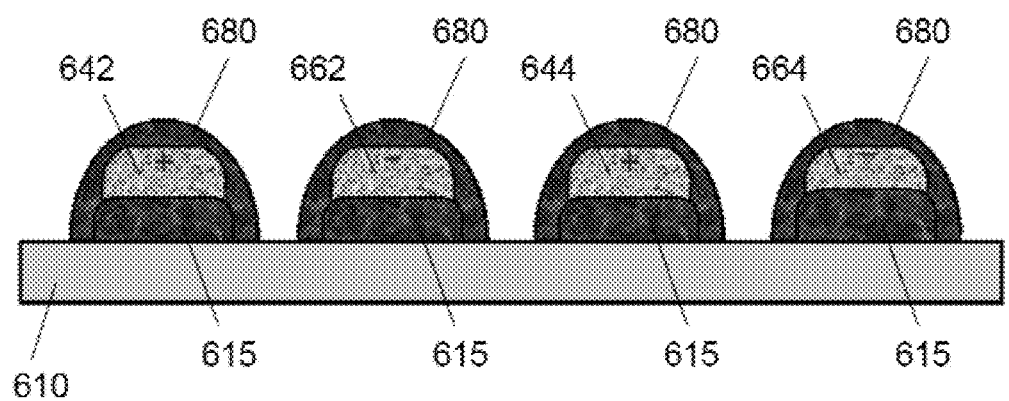
FIG. 6B is a cross-section schematic illustration of an array of supercapacitors that have a carbon layer between the substrate and the current collector and an additional carbon layer over the current collector, according to an embodiment of the invention.

FIG. 6B is a cross-section schematic illustration of an array of supercapacitors that is a modification of the array shown in FIG. 6A. There are carbon lines 615 printed onto the substrate 610. Two fingers or lines 642, 644 of the positive current collector and two fingers or lines 662, 664 of the negative current collector are shown. There is an additional carbon layer 680 over the current collectors 642, 662, 644, 664 and the underlying carbon layer 615. There is also an electrolyte layer (not shown) over the structures shown in FIGS. 6A and 6B.

Figure 7A:
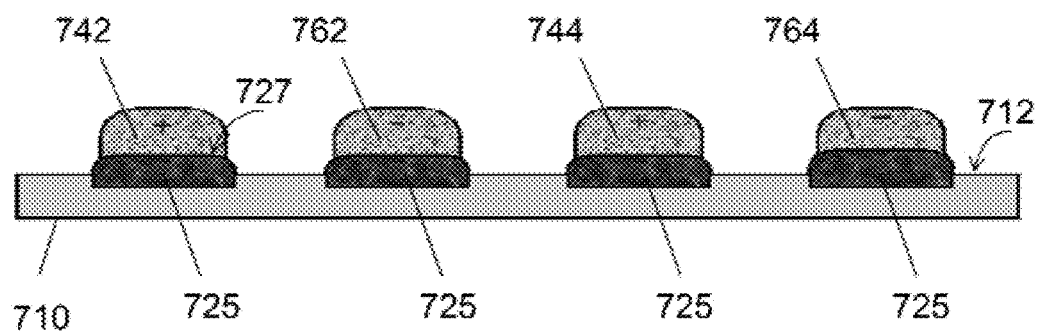
FIG. 7A is a cross-section schematic illustration of an array of supercapacitors that have a carbon layer formed from the substrate between the substrate and the current collector, according to an embodiment of the invention.

FIG. 7A is a cross-section schematic illustration of an array of supercapacitors that have a carbon layer formed from the substrate between the substrate and the current collector, according to an embodiment of the invention. The substrate 710 is made of a material that can be carbonized through heat or laser treatment. Examples of such materials include, but are not limited to, poly(methyl methacrylate), polycarbonate, polystyrene, polyether ether ketone, polyaryl sulphone, polypheneylene sulfide, polyethylene terephthalate polyethylene naphthalate, and polyimide. Carbon lines 725 are shown as partially embedded into the substrate 710 as they have been formed by carbonizing the substrate 710 through laser or heat treatment. In one arrangement, the top 727 of the carbon lines 725 are even with the top surface 712 of the substrate 710. In another arrangement, the top 727 of the carbon lines are slightly lower than the top surface 712 of the substrate 710. Two fingers or lines 742, 744 of the positive current collector and two fingers or lines 762, 764 of the negative current collector are also shown in FIG. 7A.

Figure 7B:
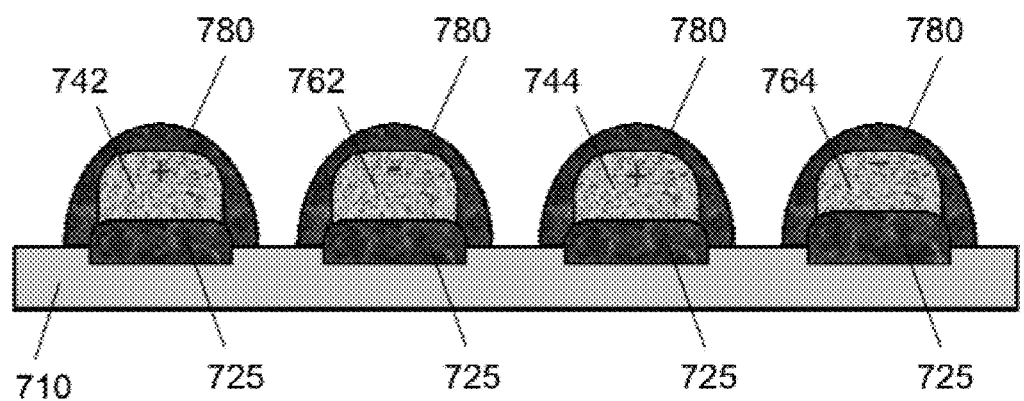
FIG. 7B is a cross-section schematic illustration of an array of supercapacitors that have a carbon layer formed from the substrate between the substrate and the current collector and an additional carbon layer over the current collector, according to an embodiment of the invention.

FIG. 7B is a cross-section schematic illustration of an array of supercapacitors that is a modification of the array shown in FIG. 7A. There is also an electrolyte layer (not shown) over the structures shown in FIGS. 7A and 7B. There are carbon lines 725 have been formed by carbonizing the substrate 710 through laser or heat treatment. Two fingers or lines 742, 744 of the positive current collector and two fingers or lines 762, 764 of the negative current collector are shown. There is an additional carbon layer 780 over the current collectors 742, 762, 744, 764 and the underlying carbon layer 725. There is also an electrolyte layer (not shown) over the structures shown in FIGS. 7A and 7B.

Figure 8A:
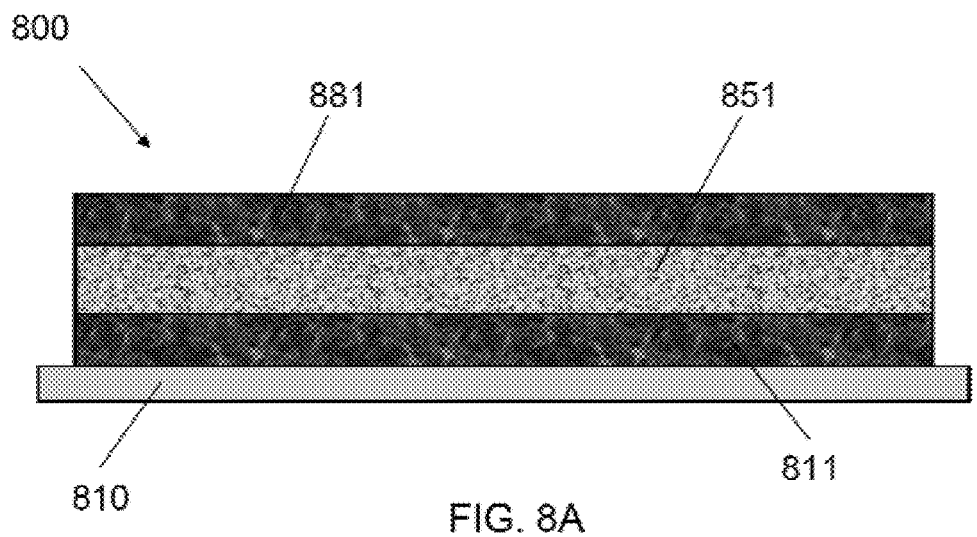
FIG. 8A is a cross-section schematic illustration of a stack of thin film layers that can be used to form a supercapacitor device array.

FIG. 8A is a cross-section schematic illustration of a stack of thin film layers 800 that can be used to form a supercapacitor device array. A first carbon layer 811 is formed onto a substrate 810. A metal layer 851 is formed over the first carbon layer 811. A second carbon layer 881 is formed over the metal layer 851. The layers can be formed using conventional coating processes, chemical vapor deposition methods, sputtering methods, or any of the printing methods disclosed herein.

Figure 8B:
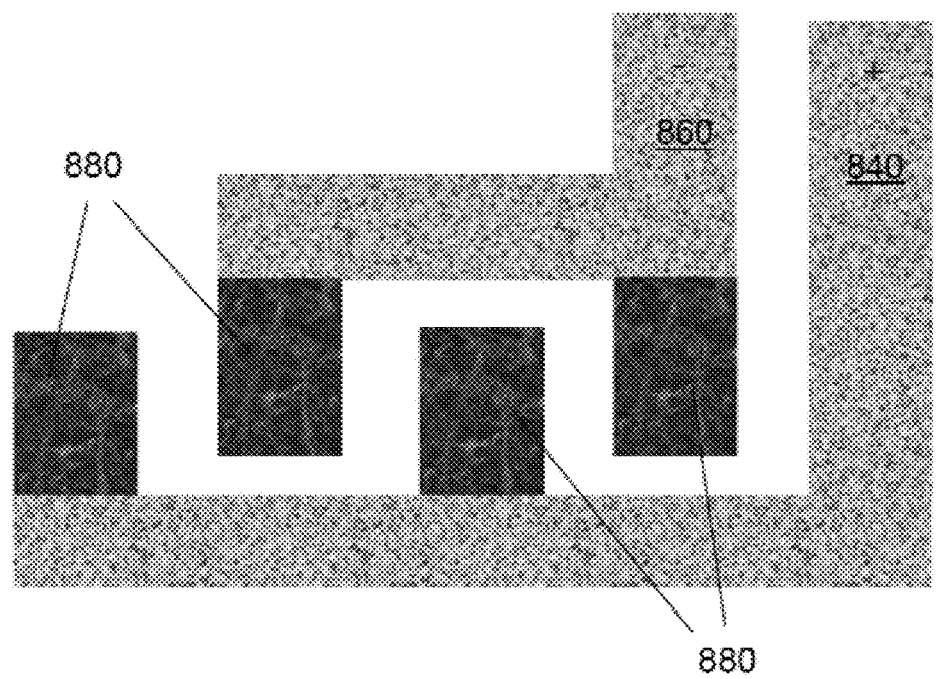
FIG. 8B is a plan-view schematic illustration of a supercapacitor device array that has been formed from the film layers in FIG. 8A, according to an embodiment of the invention.

FIG. 8B is a plan-view schematic illustration of a supercapacitor device array that has been formed from the film layers in FIG. 8A, according to an embodiment of the invention. Portions of the layer stack 800 have been removed. Regions 880 of the second carbon layer 881 can be seen. The regions 880 form electrodes for a supercapacitor device array. Under these regions 880 are also regions of the metal layer 851, which acts as current collector and regions of the first carbon layer 811 that form additional electrodes. Again, the current collectors are comb structures 840, 860 with fingers. The current collectors have an interdigitated arrangement.

Figure 8C:
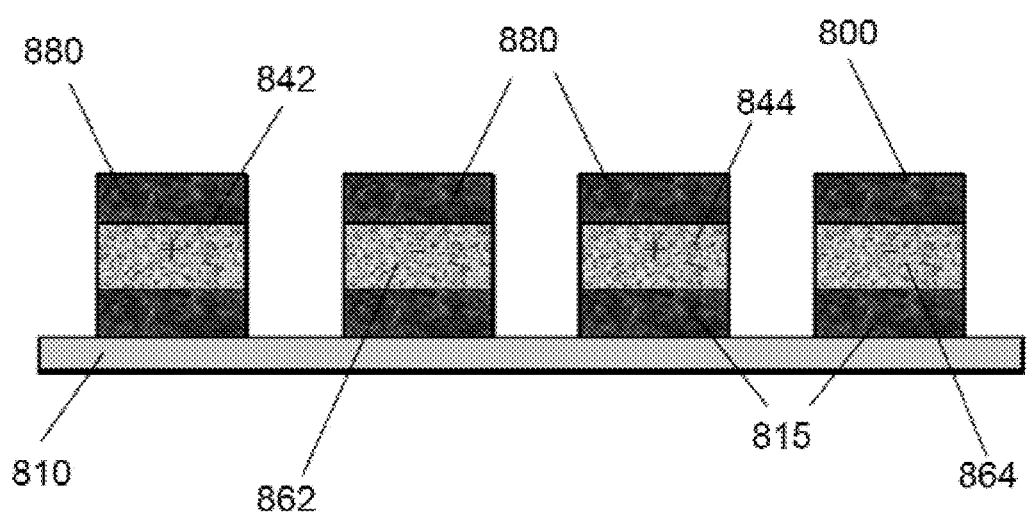
FIG. 8C is a cross-section schematic illustration of the supercapacitor of FIG. 8B, according to an embodiment of the invention.

FIG. 8C is a cross-section schematic illustration of a portion of the supercapacitor device array in FIG. 8B. The supercapacitor devices that have been formed are shown. Each stack includes a carbon electrode 815 on the substrate 810, a positive current collector finger 842, 844 or a negative current collector finger 862, 864, and more carbon electrode material 880 over the current collector fingers. The positive current collector fingers 842, 844 connect to the positive current collector 840 as shown in FIG. 8B. The negative current collector finger 862, 864 connect to the negative current collector 860 as shown in FIG. 8B. There is also an electrolyte layer (not shown) over the structures shown in FIGS. 8B and 8C. Each set of adjacent stacks, one with a positive electrode finger and one with a negative electrode finger make one supercapacitor device.

For any of the embodiments described herein, designations of positive and negative current collectors are arbitrary. Alternatively, such designations may be reversed, as long as there are current collectors of opposite polarity in the device. Also, some surfaces have been described as top surfaces. It should be noted that the designation of top is related to the figures as drawn, and may be more strictly defined as the surface that faces away from the substrate.

In one arrangement, the carbon electrodes have a thickness between about 0.01 µm and 1000 µm or between about 0.1 µm and 100 µm. The substrate material may be any of paper, plastic, glass, ceramic, or silicon. The plastic may be any of poly(methyl methacrylate), polycarbonate, polystyrene, polyether ether ketone, polyaryl sulphone, polyphenylene sulfide, polyethylene terephthalate, polyethylene naphthalate, and polyimide. The carbon electrode material(s) may be porous and may be any of activated carbon, carbon aerogels, carbon onions, carbide derived carbon, carbon nanotubes, fullerenes, graphite, graphene, and mixtures thereof.

The carbon electrode materials may have any of a wide range of hierarchical structures and pore sizes, including macroporous (pore diameters greater than 50 nm), mesoporous (pore diameters between 2 and 50 nm), and/or microporous (pore diameters less than 2 nm). The carbon electrode materials may also doped with oxygen, nitrogen, and/or boron.

For any of the embodiments described herein, the positive carbon electrodes associated with the positive current collector arrays and the negative carbon electrodes associated with the negative current collector arrays may or may not be made of the same carbon materials. In an exemplary embodiment, the positive carbon electrodes are made of a metal oxide containing porous graphene, and the negative carbon electrodes are made of laser-scribed porous graphene, such as described in El-Kady, "Engineering three-dimentional hybrid supercapacitors and microsupercapacitors for high-performance integrated energy storage", PNAS 2015 112 (14) 4233-4238.

For any of the embodiments described herein, the current collector layers may be made of silver, gold, aluminum, copper, or nickel. The current collector layers may be made of metal nanowires, metal nanoparticles, or combinations thereof. The current collector layers may be a mixture of silver nanowires, graphene and binder. For any of the embodiments described herein, the electrolyte may be any of aqueous liquid electrolytes, organic liquid electrolytes, ionic liquids and solids, polymer gel electrolytes, solid polymer electrolytes, and combinations thereof.

In one embodiment of the invention, any of the devices described with reference to FIGS. 1-5 are arranged face-to-face to form a supercapacitor with a so-called sandwich geometry, as would be known to a person with ordinary skill in the art.

In some embodiments of the invention, the devices described with reference to FIGS. 1-5 are printed onto both sides of the substrate. Such double-sided devices can be stacked one on top of the other to form a supercapacitor with a prismatic geometry.

In yet other embodiments of the invention, when the substrate is flexible, single-sided or double sided devices can be wound up to form supercapacitors with cylindrical geometry.

In one embodiment of the invention, a method of making a supercapacitor is provided. The method involves first providing a substrate that has a working surface onto which the supercapacitor device can be printed. The working surface may be prepared with a polymer buffer layer, an oxygen plasma treatment, an ultraviolet ozone treatment or any combination of these.

A carbon ink is used to print a parallel array of carbon electrodes onto the working surface of the substrate. The carbon ink includes at least one carbon material, an optional binder, an optional conducting additive, an optional metal oxide, and an optional metal sulfide. The carbon material may be any of activated carbon, carbon aerogels, carbon onions, carbide derived carbon, carbon nanotubes, fullerenes, graphite, graphene, and mixtures thereof.

The binder may include polyvinylidene fluoride and its copolymers. The metal oxide may be any of ruthenium ($RuO_2$), iridium ($IrO_2$), iron ($Fe_3O_4$), cobalt ($Co_3O_4$), nickel (NiO and $Ni(OH)_2$), vanadium ($V_2O_5$), and manganese ($MnO_2$). The sulfide may be titanium sulfide ($TiS_2$). The conducting additive may be any of metal powders, metal nanowires, and conducting polymers. The conducting polymer may be any of acetylene black, polyaniline, polypyrrole, and polythiophene. The inclusion of polyaniline, polypyrrole or polythiophene can be achieved by a conventional dispersion process involving mechanical mixing or by in situ electropolymerication of the corresponding aniline, pyrrole or thiophene monomer onto a preformed carbon electrode. After the carbon ink is printed onto the substrate, it is dried. If the carbon ink contains graphene oxide, the drying step also includes a reducing reaction that converts the graphene oxide to graphene. There are various methods for making this conversion as would be known to a person with ordinary skill in the art. Such methods include heating in an inert atmosphere, such as in hydrogen or methane to temperatures such as between 300° C. and 1200° C. Reduction can also be accomplished, for example, using a plasma assisted process at a voltage power between 500 and 2000 volts under less than one atmospheric pressure in the presence of hydrogen, methane, ammonia, argon or a mixture thereof. Laser processing, xenon lamps, and photochemical processing using UV radiation can also be used to reduce graphene oxide to graphene.

Alternatively, at least a portion of the carbon electrodes are formed by carbonizing the substrate. Substrates that can be carbonized easily by laser or heat treatment or include, but are not limited to, poly(methyl methacrylate), polycarbonate, polystyrene, polyether ether ketone, polyaryl sulphone, polypheneylene sulfide, polyethylene terephthalate polyethylene naphthalate, and polyimide. Details of such carbonization can be found, for example, in Zhiwei Peng et al. "Flexible and Stackable Laser Induced Graphene Supercapacitors"*ACS Appl. Mater. Interfaces,* 2015, 7 (5), pp 3414-3419.

A metal ink is used to print current collectors in contact with the array of carbon electrodes. The current collectors form two interdigitated structures as described above. The metal ink may contain metal nanoparticles or metal complex precursors. Examples of such metal nanoparticles or metal complex precursors include one or more metals selected from silver, gold, aluminum, copper and nickel. After the metal current collectors are printed, the substrate is heat treated. An exemplary heat treatment involves heating to a temperature between 150 and 300° C. for between land 120 minutes. Finally, an electrolyte is applied over the current collectors and carbon electrodes to make contact with the carbon electrodes.

Printing the carbon ink and the metal ink may involve inkjet, Gravure, flexo, offset, microcontact, screen, co-extrusion printing or any combination of these.

In another embodiment of the invention, another method is provided, and the steps outlined above are performed in a different order. First a substrate that has a working surface onto which the supercapacitor device can be printed is provided as discussed above. Then a metal ink is used to print interdigitated current collectors onto the working surface of the substrate. The substrate is heat treated, as described above. Alternatively, the substrate may be metallized. The metallization may be performed by conventional plating, or by thermal spraying onto the substrate, or metallized PET may be bought and used as the metallized substrate. The metallized substrate is then etched or laser ablated to form interdigitated current collectors. Next, carbon ink is used to print a parallel array of carbon electrodes onto the current collectors. After the carbon ink is printed onto the current collectors, it is dried. If the carbon ink contains graphene oxide, the drying step also includes a reducing reaction that converts the graphene oxide to graphene. Finally, an electrolyte is applied over the current collectors and carbon electrodes to make contact with the carbon electrodes.

In yet another embodiment of the invention, an alternative method of making a supercapacitor is provided. The method involves first providing a substrate that has a working surface onto which the supercapacitor device can be deposited. The working surface may be prepared with a polymer buffer layer, an oxygen plasma treatment, an ultraviolet ozone treatment or any combination of these. A carbon electrode layer is printed onto the surface of the substrate. Alternatively a substrate that already has carbon layer on its surface may be provided. The carbon surface is etched or laser ablated to leave only an array of parallel carbon electrodes. If the carbon layer contains graphene oxide, a reducing reaction that converts the graphene oxide to graphene is performed as discussed above.

Alternatively, at least a portion of the carbon electrodes are formed by carbonizing the substrate. As discussed above, substrates that can be carbonized easily by laser or heat treatment or include, but are not limited to, poly(methyl methacrylate), polycarbonate, polystyrene, polyether ether ketone, polyaryl sulphone, polypheneylene sulfide, polyethylene terephthalate polyethylene naphthalate, and polyimide.

A metal ink is used to print current collectors in contact with the array of carbon electrodes. The current collectors form two interdigitated structures as described above. The metal ink may contain metal nanoparticles or metal complex precursors. Examples of such metal nanoparticles or metal complex precursors include one or more metals selected from silver, gold, aluminum, copper and nickel. After the metal current collectors are printed, the substrate is heat treated. An exemplary heat treatment involves heating to a temperature between 150 and 300° C. for between 1 and 120 minutes. Finally, an electrolyte is applied over the current collectors and carbon electrodes to make contact with the carbon electrodes.

In another embodiment of the invention, yet another method of making a supercapacitor is provided. The method involves first providing a substrate that has a working surface onto which the supercapacitor device can be deposited. The working surface may be prepared with a polymer buffer layer, an oxygen plasma treatment, an ultraviolet ozone treatment or any combination of these. A metal layer is deposited onto the surface of the substrate. Alternatively a substrate that already has metal layer on its surface may be provided. The metal surface is etched or laser ablated to leave only a pair of interdigitated current collectors. Next, carbon ink is used to print a parallel array of carbon electrodes onto the current collectors. After the carbon ink is printed onto the current collectors, it is dried. If the carbon ink contains graphene oxide, the drying step also includes a reducing reaction that converts the graphene oxide to graphene. Finally, an electrolyte is applied over the current collectors and carbon electrodes to make contact with the carbon electrodes.

In some arrangements, an additional carbon layer is printed over the current collector.

Figure 9A:
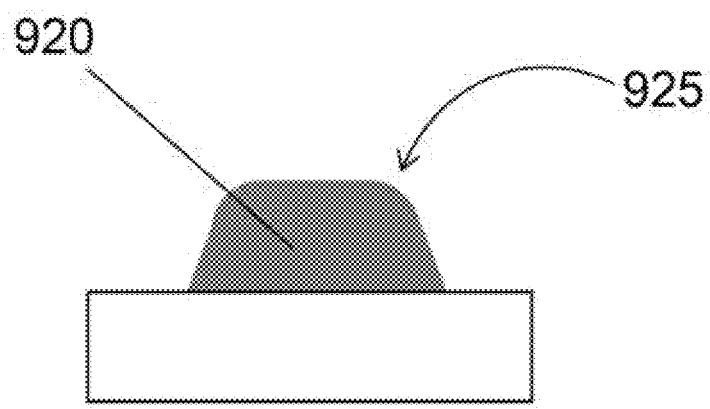
FIG. 9A is a cross-section view of a carbon or metal line that has been made using a printing method.
Figure 9B:
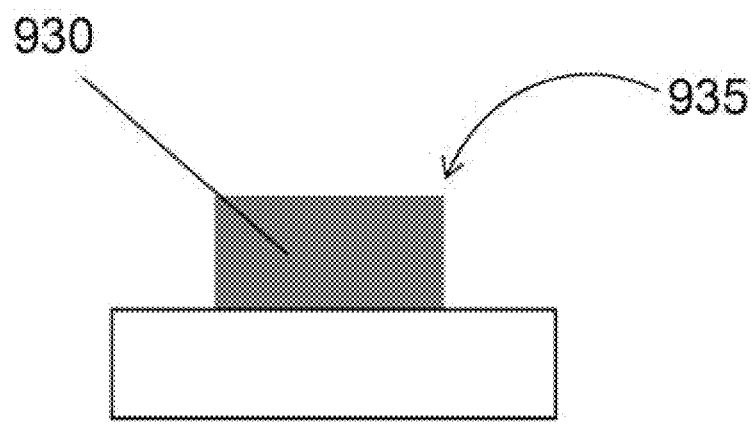
FIG. 9B is a cross-section view of a carbon or metal line that has been made using a masking and etching method.

Printing the carbon ink and the metal ink may involve inkjet, Gravure, flexo, offset, microcontact, screen, co-extrusion printing or a combination of these. There is an artifact of printing methods that may not be present in more traditional masking and etching processes. In general, printing processes yield cross-section profiles that do not have sharp corners, but are somewhat rounded. Some printing methods generally yield lines that have cross-section profiles such as that show by 920 in FIG. 9A. Note that the profiles are trapezoidal with rounded corners 925. Other printing processes may yield other cross-section profiles, such as semicircular. In contrast, masking and etching processes generally yield lines that have sharp cross-section profiles such as that show by 930 in FIG. 9B. Note that the corners 935 of the cross section are square. The rounded corners 925 of the printed line profiles provide a more even distribution of electric field strength than for the square corners 935 of masked and etched lines where electric field strength is highly concentrated. A more even electric field strength distribution may offer advantages in higher efficiency and longer lifetime.

For all methods, additional steps may involve making sandwiches of such devices. In one embodiment, the process described above is also performed on the opposite side of the substrate. Such processed substrates can be stacked together to form prismatic supercapacitors. In another arrangement, the substrate is flexible and it can be wound into a "jelly roll" shape and optionally placed into a canister.

In one embodiment of the invention, the current collector is porous and the carbon ink penetrates into the pores of the current collector, thereby increasing the surface area of the interface between the carbon electrode and the current collector, and increasing the efficiency of the device. This is more likely to happen when the metal current collectors are printed first and the carbon electrodes are printed second.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

I claim:

1. A supercapacitor device array comprising:
a plurality of devices arranged parallel to one another on a substrate, wherein each device comprises;
a first carbon electrode, having an upper surface, a lower surface in contact with the substrate, and two sidewalls opposite to one another;
a first metal current collector layer in contact with at least a portion of one sidewall and optionally some or all of the top surface of the first carbon electrode;
a second carbon electrode parallel to the first carbon electrode, the second carbon electrode having an upper surface, a lower surface in contact with the substrate, and two sidewalls opposite to one another; and
a second metal current collector layer, opposite in polarity to the first current collector layer, the second metal current collector layer in contact with at least a portion of a sidewall of the second carbon electrode and optionally some or all of the top surface of the second carbon electrode, the sidewall of the second carbon electrode facing away from the first carbon electrode; and
an electrolyte in contact with the carbon electrodes;
wherein, within the plurality of devices, the first metal current collector layer and the second metal current collector layer each has a separate comb structure and the comb structures are arranged in an interdigitated configuration; and
wherein, within the plurality of devices, the first metal current collector is in contact with a plurality of the first carbon electrodes, and the second metal current collector is in contact with a plurality of the second carbon electrodes.

2. The device array of claim 1 wherein each device further comprises:

a third carbon electrode, having an upper surface, a lower surface in contact with the substrate, and two sidewalls, the third carbon electrode parallel to the first carbon electrode;
wherein the first metal current collector layer is also in contact with at least a portion of one sidewall and optionally some or all of the top surface of the third carbon electrode; and
a fourth carbon electrode, having an upper surface, a lower surface in contact with the substrate, and two sidewalls, the fourth carbon electrode parallel to the second carbon electrode;
wherein the second metal current collector layer is also in contact with at least a portion of one sidewall and optionally some or all of the top surface of the fourth carbon electrode.

3. The device array of claim 2 wherein each device further comprises:
a fifth carbon electrode that is in continuous contact with both the first carbon electrode and the third carbon electrode, the fifth carbon electrode extending from the first carbon electrode to the third carbon electrode and encapsulating the first metal current collector; and
a sixth carbon electrode that is in continuous contact with both the second carbon electrode and the fourth carbon electrode, the sixth carbon electrode extending from the second carbon electrode to the fourth carbon electrode and encapsulating the second metal current collector.

4. The device array of claim 1, wherein the carbon for each electrode is selected independently from the group consisting of activated carbon, carbon aerogels, carbon onions, carbide derived carbon, carbon nanotubes, fullerenes, graphite, graphene, and mixtures thereof.

5. The device array of claim 4, wherein the carbon further comprises one or more of a binder, a conducting additive, a metal oxide, and a metal sulfide.

6. The device array of claim 5 wherein the binder is selected from the group consisting of polyvinylidene fluoride and its copolymers.

7. The device array of claim 5 wherein the conducting additive is selected from the group consisting of metal powders, metal nanowires, acetylene black, polyaniline, polypyrrole, and polythiophene.

8. The device array of claim 5 wherein the metal oxide is selected from the group consisting of ruthenium ($RuO_2$), iridium ($IrO_2$), iron ($Fe_3O_4$), cobalt ($CO_3O_4$), nickel (NiO and $Ni(OH)_2$), vanadium ($V_2O_5$), and manganese ($MnO_2$).

9. The device array of claim 5 wherein the metal sulfide comprises titanium sulfide ($TiS_2$).

10. The device array of claim 1, wherein the carbon electrodes have a thickness between about 0.01 μm and 1000 μm.

11. The device array of claim 1, wherein the substrate material is selected from the group consisting of paper, plastic, glass, ceramic, and silicon.

12. The device array of claim 11, wherein the substrate material further comprises a polymer buffer layer or oxygenated between the substrate and the device array.

13. The device array of claim 1, wherein the current collector layers each comprise a metal selected independently from the group consisting of silver, gold, aluminum, copper, and nickel.

14. The device array of claim 1, wherein at least some of the current collector layers comprise metal nanowires or metal nanoparticles or mixtures thereof.

15. The device array of claim 1, wherein at least some of the current collector layers comprise a mixture of silver nanowires, graphene and binder.

16. A supercapacitor device array comprising:
- a first array of parallel carbon lines on a substrate, the first array comprising first carbon lines and second carbon lines, the first carbon lines and the second carbon lines occupying alternating positions in the first array of parallel carbon lines;
- a first current collector having a first polarity, the first current collector having a comb structure with parallel first current collector fingers, the first current collector fingers overlying the first carbon lines, the first current collector fingers having no contact with the substrate;
- a second current collector having a second polarity opposite to the first polarity, the second current collector having comb structure with parallel second current collector fingers, the second current collector fingers overlying the second carbon lines, the second current collector fingers having no contact with the substrate;
- a second array of parallel carbon lines parallel to the first array of parallel carbon lines, the second array comprising third carbon lines and fourth carbon lines, the third carbon lines and the fourth carbon lines occupying alternating positions in the second array of parallel carbon lines wherein:
- the third carbon lines overlie the first current collector fingers; and
- the fourth carbon lines overlie the second current collector fingers; and
- an electrolyte in contact with at least the second array of parallel carbon lines.

17. The device array of claim 16 wherein at least one of the first array of parallel carbon lines and the second array of parallel carbon lines extends into the substrate.

18. The device array of claim 16, wherein:
- the third carbon lines have no contact with the first carbon lines; and
- the fourth carbon lines have no contact with the second carbon lines.

19. The device array of claim 16, wherein:
- the third carbon lines make continuous contact with the first carbon lines and optionally with the substrate, thereby encapsulating the first current collector fingers; and
- the fourth carbon lines make continuous contact with the second carbon lines and optionally with the substrate, thereby encapsulating the second current collector fingers.

20. A method of making a supercapacitor device array, comprising the steps of:
- a) providing a substrate that has a working surface;
- b) providing a carbon ink;
- c) printing the carbon ink onto the working surface of the substrate to form an array of parallel carbon electrode lines;
- d) drying the carbon ink;
- e) providing a metal ink;
- f) printing the metal ink to form two interdigitated current collector structures in contact with the array of carbon electrodes;
- g) heat treating the substrate; and
- h) applying an electrolyte to make contact with the carbon electrode lines.

* * * * *